Oct. 27, 1959 W. G. FERRELL ET AL 2,910,148
BI-METALLIC HOUSING CONSTRUCTION FOR FRICTION DEVICES
Filed April 23, 1956 4 Sheets-Sheet 1

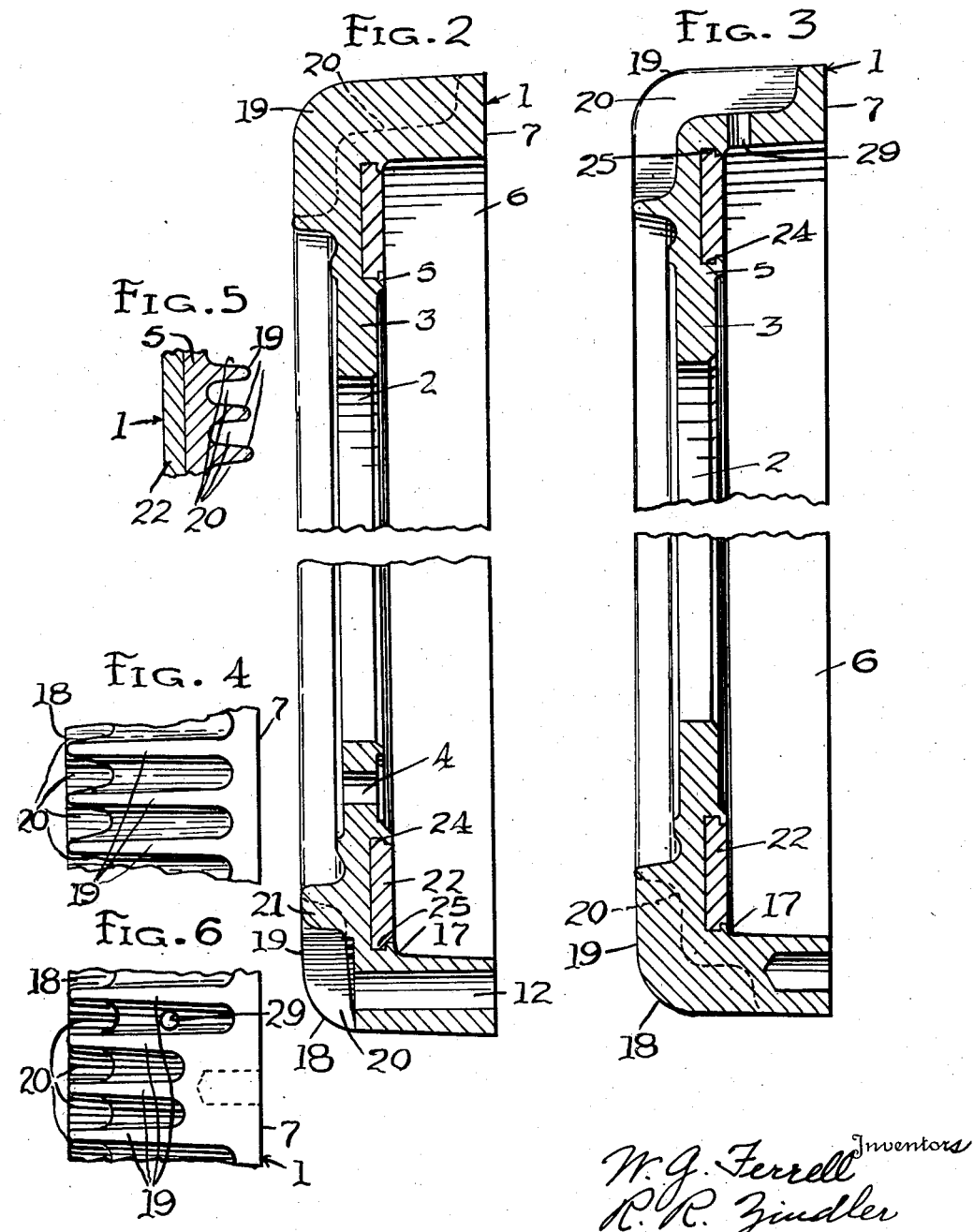

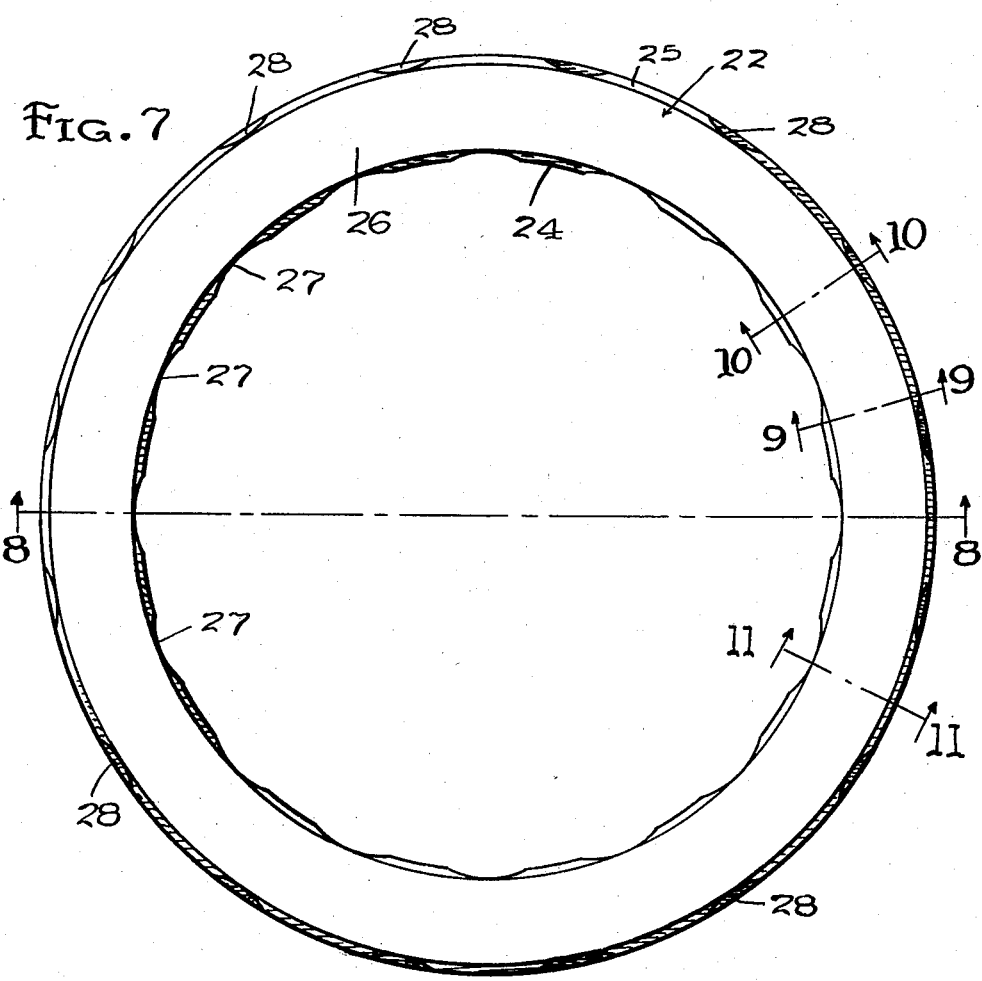
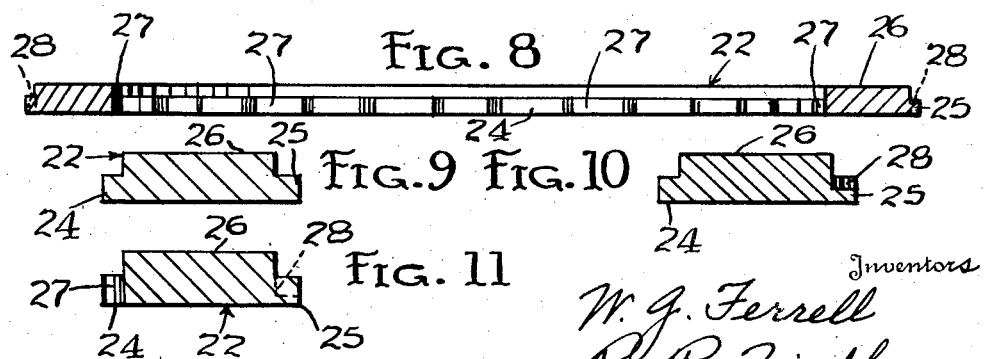

Oct. 27, 1959 W. G. FERRELL ET AL 2,910,148
BI-METALLIC HOUSING CONSTRUCTION FOR FRICTION DEVICES
Filed April 23, 1956 4 Sheets-Sheet 4

Inventors
W. G. Ferrell
R. R. Zindler
By Robb & Robb
Attorneys

United States Patent Office 2,910,148
Patented Oct. 27, 1959

2,910,148
BI-METALLIC HOUSING CONSTRUCTION FOR FRICTION DEVICES

William G. Ferrell, Benton Harbor, and Roger R. Zindler, St. Joseph, Mich., assignors, by mesne assignments, to Lambert Brake Corporation, St. Joseph, Mich., a corporation of Michigan Application April 23, 1956, Serial No. 579,940

11 Claims. (Cl. 188—218)

The present invention relates to housings for friction devices such as brakes and the like, and more particularly to an improved light-weight, easily manufactured, bi-metallic housing construction which will endure the heat and strains attending operation of such friction devices.

Heretofore, efforts have been made to produce a serviceable brake housing employing an aluminum alloy so as to avail of the properties of rapid heat dissipation, ease of manufacture, and reduction in weight afforded by aluminum. In view of the inability of aluminum to stand up under the high temperatures produced by frictional engagement of a friction member with a brake housing or drum, friction facings of cast iron or other material which is more durable than aluminum and which is capable of withstanding such heat and wear, have sometimes been secured to the aluminum housings.

However, all of these prior bi-metallic housings have been more or less impractical and incapable of long usage under normal braking conditions.

Accordingly an object of the present invention is to provide a bi-metallic brake housing which is so constructed as to withstand braking pressures applied thereto by friction members engaging the same during brake operations.

Another object is to provide a bi-metallic housing which will withstand the heat generated under brake applications, such heat ranging up to as much as 1000° in modern automobile brakes. Particularly, the invention concerns the production of a brake housing for disc brakes, although certain aspects thereof are not necessarily limited to disc brake housings alone, and specifically the invention concerns the production of an annular brake housing of generally U-shaped cross-section at any point about the annulus, and having therein opposed, axially spaced and radially extended annular friction faces adapted to be engaged by friction discs during brake operation.

The problems attending the accomplishment of the foregoing objectives in the construction of a serviceable aluminum alloy housing of the aforesaid type, having cast iron, steel, or other ferrous or non-ferrous metallic friction facings, include essentially the elimination of the inherent tendency of the aluminum housing to bow or become deformed as the result of braking pressures, and the tendency of the cast iron or other metallic friction facings to warp as the result of heat produced during brake applications. In the latter case, warpage of cast iron friction facings has usually caused cracking and ultimate breaking up of the cast iron facings and consequent destruction of the usefulness of the housing.

A further object, therefore, is to provide a bi-metallic brake housing of the aforementioned type which is so constructed that pressure applied by brake-applying friction discs to the opposed friction facings in the housing will not bow the side walls of the housing outwardly or otherwise deform the housing. This objective is attained by a combination of features which will be hereinafter specifically described.

Still another object is to provide a bi-metallic housing of the type aforementioned, wherein an aluminum housing is so constructed as to more readily dissipate heat generated during brake applications, and wherein cast iron friction facings are so connected to and interlocked with the aluminum housing that warpage and consequent cracking and breaking up of the cast iron facings is effectively precluded.

Yet another object is to provide a composite aluminum and cast iron brake housing of the aforementioned type, in which the cast iron friction facings are secured in the housing during die-casting of the aluminum housing.

By the accomplishment of the foregoing objectives, as well as others which will be hereinafter described or will become apparent to those skilled in the art, an improved brake housing is provided, said brake housing being light in weight, easy to manufacture, and less costly to produce, yet being strong, durable and highly serviceable under the strains and heat to which it is subjected during brake applications.

In the accompanying drawings:

Fig. 2 is an enlarged view in transverse section, as taken on the line 2—2 of Fig. 1;

Fig. 3 is an enlarged view in transverse section, as taken on the line 3—3 of Fig. 1;

Fig. 4 is an enlarged fragmentary view in edge elevation, as viewed toward the outer periphery of the portion of the housing section of Fig. 1 embraced by the line 4—4;

Fig. 5 is an enlarged fragmentary view in section, as taken on the line 5—5 of Fig. 1;

Fig. 6 is an enlarged fragmentary view in edge elevation, as viewed toward the outer periphery of the portion of the housing section of Fig. 1 embraced by the line 6—6;

Fig. 7 is an enlarged detail view in elevation of a friction facing member made in accordance with the invention;

Fig. 8 is a view in section, as taken on the line 8—8 of Fig. 7;

Fig. 9 is an enlarged view in section, as taken on the line 9—9 of Fig. 7;

Fig. 10 is an enlarged view in section, as taken on the line 10—10 of Fig. 7;

Fig. 11 is an enlarged view in section as taken on the line 11—11 of Fig. 7;

Figure 1:
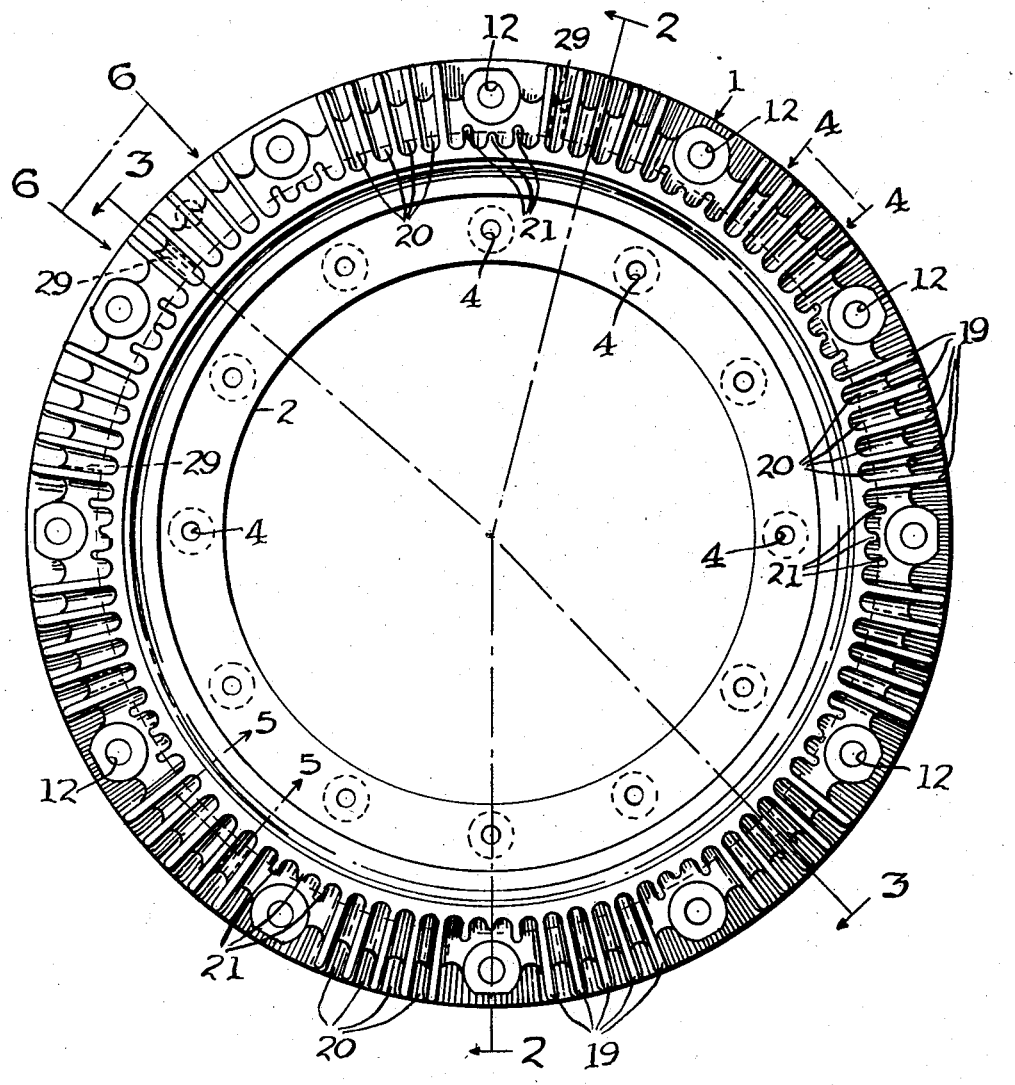
Fig. 1 is a view in elevation of the outboard section of a 2-part brake housing made in accordance with the invention.

Like reference characters in the several figures of the drawings and in the following detailed description designate corresponding parts, wherein 1 generally denotes the outboard section of a rotatable brake housing made in accordance with the invention. The housing section 1 is of annular form and is generally cup-shaped in cross-section, as best seen in Figs. 2 and 3. Extending axially through the central portion of the housing section 1, there is an opening 2 which is adapted to receive a complemental portion of a rotatable wheel-mounting hub (not shown). The opening 2 is located in a central web-portion 3 of the housing section 1, and this web portion 3 is also provided with a plurality of circumferentially and equi-distantly spaced openings 4 which are adapted to receive suitable lug bolts, screws or other fastener means for connecting the housing section 1 to a wheel rim or some other rotary member (not shown) for rotation therewith.

Figure 12:
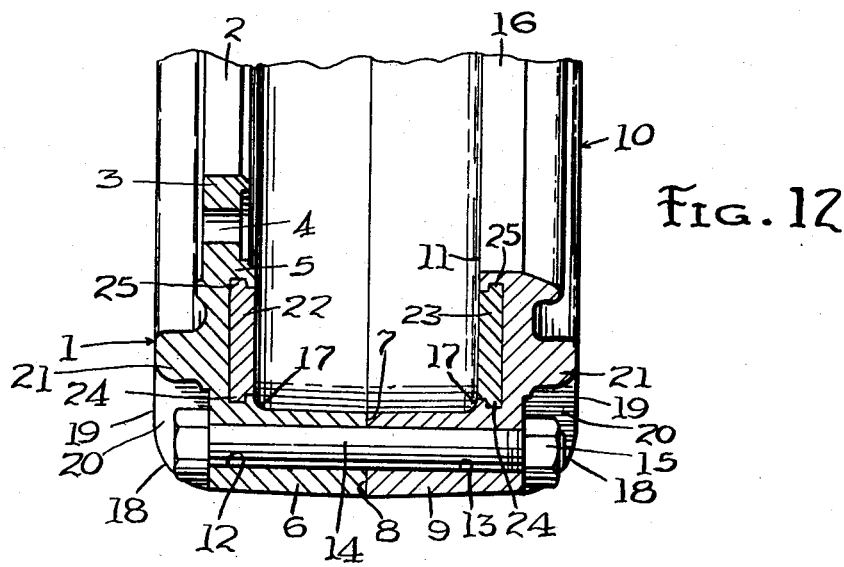
Fig. 12 is a fragmentary view in transverse section, showing the outboard housing section of Fig. 1 assembled with a complemental generally similar inboard housing section to form a complete housing in accordance with the invention.
Figure 13:
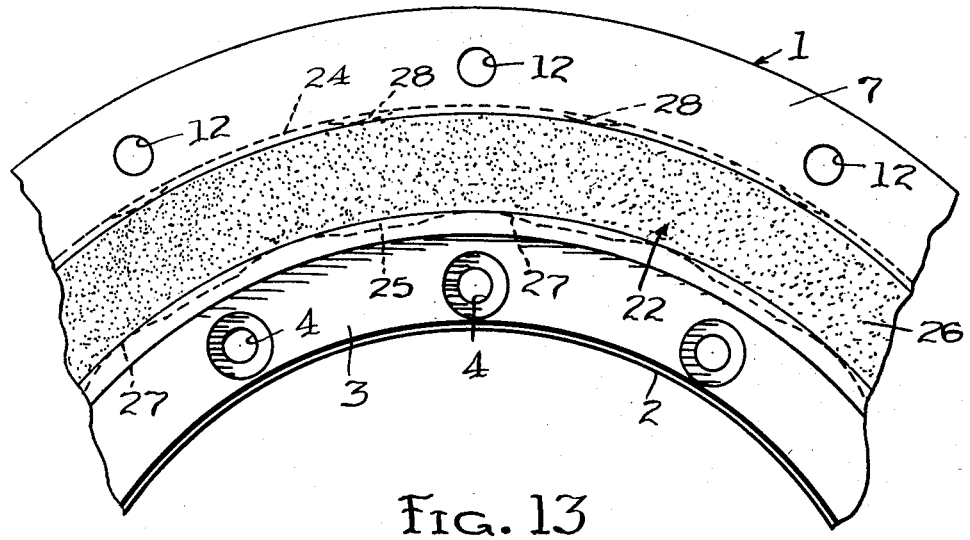
Fig. 13 is an enlarged fragmentary view in elevation of the inboard face of the outboard housing section of Fig. 1.

Extending radially outwardly from the web portion 3 of the housing section 1 is a radial wall 5, at the outer extremity of which there is an axially extended peripheral wall 6 projecting in an inboard direction from the radial wall 5, this peripheral wall 6 terminating in a flat face 7 adapted for abutting contact with a complemental flat face 8 of a similar peripheral wall 9 of an inboard housing section 10 (see Fig. 12).

The inboard housing section 10 is also provided with a radial wall 11 which is disposed in opposed, axially spaced, parallel relation to the radial wall 5 of the outboard housing section 1. The housing sections 1 and 10 are provided with aligned openings 12 and 13, respectively, which extend in co-axial relation through the abutting peripheral walls 6 and 9 of the housing sections for receiving suitable fastener means such as bolts 14, each having a nut 15 thereon for rigidly fastening the housing sections together, all as is best seen in Fig. 12.

The primary distinction between the outboard and inboard housing sections 1 and 10, respectively, is that the radial wall 11 of the inboard housing section 10 has no web or flange portion such as that designated 3 on the outboard housing section 1. Instead, the radial wall 11 of the inboard housing section 10 is provided with a central opening 16, whereby the wall 11 is adapted to encircle suitable stationary supporting means (not shown) for an appropriate brake disc assembly (not shown), which brake disc assembly is adapted to be disposed within the composite housing 1, 10, with the discs disposed between the opposed radial walls 5 and 11 of the housing sections 1 and 10, respectively, for frictional engagement with said radial walls. The specific construction of the brake disc assembly and supporting means just referred to is of no import in respect to the present invention, and therefore need not be specifically described herein. However, the composite housing 1, 10 is particularly adapted for use with a brake disc and support assembly generally corresponding to that disclosed in Patent No. 2,595,860, dated May 6, 1952, or other brake disc assemblies of a similar nature which, during brake applications, apply substantial braking forces to the radial walls 5 and 11 of the housing. Such braking forces subject the housing sections 1 and 10 to severe strains which have heretofore made it impractical to produce a housing wholly of a material such as aluminum, which has the properties of being light in weight and easy to fabricate, as well as the property of rapidly dissipating heat generated during brake applications. Previous efforts toward the production of such a housing as that disclosed in the patent above-mentioned utilizing aluminum as the housing material have not been entirely successful, though the industry in general has spent much time, effort and money in this endeavor. However, by virtue of the specific structural details now to be described, the present invention attains the desired results, and the composite housing sections 1 and 10 are preferably fabricated of a suitable aluminum alloy so as to derive the benefits of the qualities of light weight, ease of manufacture, and rapid heat dissipation afforded by such alloy, while eliminating the tendency of the radial walls 5 and 11 of the housing to bow under maximum loads at elevated temperatures as the result of pressures applied thereto by the brake discs during brake applications.

Maximum stress on the housing occurs at the intersection of the radial walls 5 and 11 with the peripheral walls 6 and 9 of the respective housing sections 1 and 10, as indicated at 17, 17 in Fig. 12. Therefore, in order to avoid bowing or deflection of the radial walls 5 and 11, the housing sections have been provided with additional mass at these points, as compared with prior constructions. Accordingly, the cross-sectional area between the points 17, 17 just referred to and the points designated 18, 18 on the housing sections 1 and 10 has been substantially increased as compared with prior housings.

In addition, the openings 12 and 13 through the respective housing sections 1 and 10 are disposed closely adjacent to the inner peripheries of the peripheral walls 6 and 9 of the housing sections 1 and 10, respectively, thus providing a substantially shorter radial dimension between the axis of the housing and the bolts or other fasteners 14 as compared with prior housing constructions of similar overall diameter. This permits the use of a smaller number of bolts, provides a smaller, lighter housing, and aids in eliminating bowing or other deformation of the radial walls 5 and 11 of the housing by virtue of the fact that the length of the moment arm is materially reduced by virtue of the location of the housing bolts 14 closer to the mean radius of the brake, and thus reducing the stress on the housing and housing bolts during brake applications.

A further factor in the elimination of housing deformation or bowing is the ability of aluminum to rapidly transfer heat, and this quality has been further enhanced by the provision of a relatively large number of fine external ribs on the outer faces of the housing sections 1 and 10. The outside faces of the radial walls 5 and 11 and the peripheral walls 6 and 9 of the housing sections 1 and 10, respectively, are provided with a multiplicity of rather thin ribs or fins 19 which are closely spaced, and which are separated by relatively narrow flutes or grooves 20. At the points where the housing sections are provided with the bolt-receiving openings 12 and 13, the ribs 19 are interrupted, and relatively short ribs or fins 21 are provided. This ribbing at 19 and 21 is finer than that of any previous housing known to us, and has particular advantage in that additional surface area is provided on the external housing surfaces which are exposed to the air. The closely-ribbed housing, therefore, provides an important heat dissipating means, and measurably reduces the maximum temperatures of the brake during brake applications, without sacrifice in the strength of the housing.

A particular advantage of constructing the aforementioned housing of aluminum, in respect to manufacturing problems, is that heretofore, ribbing of brake housings has been a costly operation, particularly in the case of conventional contemporary grey iron housing constructions. Because of the high melting temperature of grey iron, it is not practicable to diecast ribbed grey iron housings; nor is it practicable to sand-cast grey iron housings having thin ribbing thereon, since grey iron cannot be sand-cast in thin sections. Therefore, the present development of a practical aluminum housing having grey iron or other ferrous or non-ferrous friction facing inserts in the opposed friction faces within the housing, which facings are capable of withstanding the temperatures and wear to which they are subjected during brake operation, results in the ability to produce the housing at less cost than has heretofore been possible. Among the primary reasons for this reduction in the cost of manufacture is the ability of aluminum to be die-cast into final form without requiring any machine operations.

The aforementioned grey iron or other friction facing inserts are necessary by reason of the fact that aluminum itself will not withstand the high temperatures generated during brake applications, such temperatures ranging upwards to 1000° in modern-day automobile brakes; nor does aluminum effectively withstand the wear occasioned by direct frictional engagement thereof by friction discs during brake operations. The use of grey iron or other friction facing inserts has heretofore been proposed in the production of aluminum brake housings such as have been hereinbefore referred to, but one of the primary problems involved in the production of a practical bi-metallic brake housing is adequate interlocking of the grey iron or other friction facing inserts with the aluminum housing. In the absence of such an effective interlock, grey iron friction facing inserts will warp, responsive to expansion caused by heat generated during braking, with attendant cracking or breaking up of the grey iron friction facings and consequent destruction of the utility of the housing.

In the illustrative embodiment, such a grey iron or other friction facing insert is generally designated 22 and is embedded in the inboard face of the radial wall 5 of the outboard housing section 1, with a similar friction facing 23 being embedded in the outboard face of the radial wall 11 of the inboard housing section 10. Thus the friction facings 22 and 23 are disposed in opposed, axially spaced, parallel relation within the housing, so as to be engaged by the friction discs previously referred to during brake operation.

With particular reference to Figs. 7 through 11, it will be seen that the friction facing 22, as well as the similar friction facing 23, is in the form of an annulus having a radially inwardly projecting flange 24 on its inner periphery and a radially outwardly projecting flange 25 on its outer periphery, these flanges 24 and 25 being set back from the friction surface 26 of the facing annulus 22. Accordingly, when the aluminum housing sections 1 and 10 are being die-cast, the friction facings 22 and 23 are cast in place, with a portion of the aluminum overlapping or overlying the flanges 24 and 25 and extending into engagement with the body of the respective annuli 22 and 23, thus interlocking the latter against axial movement in relation to the respective housing sections 1 and 10. This interlocking engagement also aids in precluding warpage of the friction facing annuli 22 and 23.

In addition, rotative movement of the friction facing inserts 22 and 23 relative to the housing sections 1 and 10, respectively, as well as warpage of the friction facing annuli 22 and 23, is precluded by the provision of a plurality of circumferentially and equi-distantly-spaced notches 27 which extend through the flange 24 of the annulus 22, these notches 27 being of any desired form, but preferably being generally arcuate in form. During the die-casting operation in the production of the bi-metallic housing, a portion of the aluminum of which the housing sections 1 and 10 are composed will be forced into the notches 27 to interlock the respective friction facing annuli 22 and 23 against rotation and warpage.

The flanges 25 on the outer periphery of the friction facing elements 22 and 23 are likewise each provided with a plurality of circumferentially and equi-distantly spaced notches 28, these notches 28 being alternately arranged with respect to the notches 27 in the flanges 24 at the inner periphery of the respective friction facings 22 and 23. Preferably, the notches 28 do not extend completely through the flange 25 of the respective friction facings, but instead extend only partially therethrough, as is best seen in Figs. 7, 10 and 11.

The ease of manufacture of the bi-metallic housing described above will be best recognized when it is understood that in the complete manufacturing operations, only very minor and simple machining operations must be resorted to, these machining operations being primarily that of finishing off the exposed friction surfaces 26 of the respective grey iron or other friction facing inserts or annuli 22, 23 to provide a flat friction facing, thus avoiding undue wear or other damage to the usual friction linings on the brake discs with which the disc brakes are normally provided.

In order to allow escape of any water, dirt, lining dust, or other foreign matter which may gather in the brake housing, one or both of the housing sections 1 and 10 is preferably provided with one or more apertures 29 formed in the peripheral wall 6 and/or 9 of the respective housing sections, as best seen in Fig. 1, and preferably, there is a plurality of such apertures 29 disposed in circumferentially and equi-distantly spaced relation therearound.

While the specific details of the invention have been herein shown and described, changes and alterations may be resorted to without departing from the spirit thereof as defined in the appended claims, and while the illustrative embodiment is in the form of a brake housing, it will be understood that the invention may be equally applicable to other specific forms of brake or friction device components. Accordingly, unless the appended claims are expressly limited to a brake housing, the terminology thereof should be construed in the broadest sense.

We claim:

1. A housing for friction devices adapted to be frictionally engaged by a friction element, said housing being made of a metal characterized by its lightness in weight, rapid heat dissipation and ease of die-casting, and a friction facing member secured to said housing and characterized by its relatively high resistance to heat and wear, said friction facing member being positively interlocked with the housing against relative movement therebetween, and said friction facing member including a body embedded in the material of said housing and having a friction surface flush with the inner face of a wall of said housing, said body also having a marginal flange provided with substantially parallel opposed faces projecting therefrom, with the material of said housing overlying said flange and engaging said body.

2. A housing for friction devices adapted to be frictionally engaged by a friction element, said housing being made of a metal characterized by its lightness in weight, rapid heat dissipation and ease of die-casting, and a friction facing member secured to said housing and characterized by its relatively high resistance to heat and wear, said friction facing member being positively interlocked with the housing against relative movement therebetween, and said friction facing member includes a body embedded in the material of said housing and having a friction surface flush with the inner face of a wall of said housing, said body also having a marginal flange projecting therefrom, with the material of said housing overlying said flange and engaging said body, and said flange being of generally undulated form.

3. A housing for friction devices adapted to be frictionally engaged by a friction element, said housing being made of a metal characterized by its lightness in weight, rapid heat dissipation and ease of die-casting, and a friction facing member secured to said housing and characterized by its relatively high resistance to heat and wear, said friction facing member being positively interlocked with the housing against relative movement therebetween, and said friction facing member includes a body embedded in the material of said housing and having a friction surface flush with the inner face of a wall of said housing, said body also having a marginal flange projecting therefrom, said flange having notches therein in which the housing material is interlockingly engaged.

4. A housing for friction devices adapted to be frictionally engaged by a friction element, said housing being made of a metal characterized by its lightness in weight, rapid heat dissipation and ease of die-casting, and a friction facing member secured to said housing and characterized by its relatively high resistance to heat and wear, said friction facing member being positively interlocked with the housing against relative movement therebetween, and said friction facing member includes a body embedded in the material of said housing and having a friction surface flush with the inner face of a wall of said housing, said body also having a marginal flange projecting therefrom, said flange having notches in one face thereof, said notches extending partially through said flange, and the material of said housing being interlockingly engaged in said notches.

5. A housing for friction devices adapted to be frictionally engaged by a friction element, said housing being made of a metal characterized by its lightness in weight, rapid heat dissipation and ease of die-casting, and a friction facing member secured to said housing and characterized by its relatively high resistance to heat and wear, said friction facing member being positively interlocked with the housing against relative movement therebetween, and said housing includes a radially extended annular wall adapted to be engaged by a friction disc, said friction facing member being in the form of an annulus, said annulus being embedded in said wall and having a friction surface flush with the inner face of said wall, said annulus also having radially extending marginal flanges on its inner and outer peripheries, said flanges being spaced from and having its opposed faces substantially parallel with the friction surface of said annulus, and the material of said housing overlapping said flanges and embracing said annulus.

6. A friction member of the class described, comprising a member having a radially extended wall, said member being made of aluminum, and a friction facing annulus made of a material capable of withstanding wear and heat generated during use of the friction member, said annulus being embedded in said member and having an exposed friction surface flush with the inner face of said wall, said annulus also having a peripheral flange, the said flange being spaced from said friction surface of the annulus, and the aluminum member overlying said flange and embracing said annulus.

7. A friction member as defined in claim 6, wherein said flange on the annulus has substantially parallel opposed faces and is provided with notches in which the aluminum member is received.

8. A friction member as defined in claim 6, wherein said flange on the annulus is provided with notches on one edge thereof, said notches extending only partially through said flange, and the aluminum member being engaged in said notches.

9. A friction member as defined in claim 6, wherein said annulus is provided with a flange on both its inner and its outer peripheries, said flanges being spaced from the friction surface of the annulus, whereby the annulus is of generally T-shaped cross section, one of said flanges having a plurality of circumferentially spaced notches therein in which the aluminum member is engaged.

10. A friction member as defined in claim 6, wherein said annulus is provided with a flange on both its inner periphery and its outer periphery, said flanges being spaced from the friction surface of the annulus, whereby the annulus is of generally T-shaped cross section, one of said flanges having a plurality of notches therethrough, the other of said flanges having a plurality of notches extending only partially therethrough, and the aluminum member being engaged in said notches.

11. A friction member as defined in claim 6, wherein said annulus is provided with a flange on both its inner periphery and its outer periphery, said flanges being spaced from the friction surface of the annulus, whereby the annulus is of generally T-shaped cross section, one of said flanges having a plurality of notches therethrough, the other of said flanges having a plurality of notches extending only partially therethrough, the notches in said flanges respectively being circumferentially spaced, and the notches of one flange being alternately arranged with respect to the notches of the other flange.

References Cited in the file of this patent

UNITED STATES PATENTS

| | | |
|---|---|---|
| 1,131,606 | GeBauer | Mar. 9, 1915 |
| 1,153,753 | Blue | Sept. 14, 1915 |
| 1,572,870 | Armstrong | Feb. 16, 1926 |
| 1,674,851 | Boykin | June 26, 1928 |
| 1,727,486 | Sauzedde | Sept. 10, 1929 |
| 1,989,211 | Norton | Jan. 29, 1935 |
| 1,998,666 | Frank | Apr. 23, 1935 |
| 2,070,847 | Sargent | Feb. 16, 1937 |
| 2,109,110 | Frank | Feb. 22, 1938 |
| 2,255,024 | Eksergian | Sept. 2, 1941 |
| 2,430,936 | Kraft | Nov. 18, 1947 |
| 2,589,682 | Dudis | Mar. 18, 1952 |
| 2,595,859 | Lambert et al. | May 6, 1952 |
| 2,720,943 | Kershner et al. | Oct. 18, 1955 |

FOREIGN PATENTS

| | | |
|---|---|---|
| 1,065,477 | France | Jan. 13, 1954 |
| 560,903 | Great Britain | Apr. 26, 1944 |
| 671,147 | Great Britain | Apr. 30, 1952 |